United States Patent [19]

Okamura et al.

[11] Patent Number: 4,609,458

[45] Date of Patent: Sep. 2, 1986

[54] DEVICE FOR REMOVING MOISTURE FROM OIL

[75] Inventors: Itsuji Okamura, Toyota; Hiroaki Matushita, Chiba; Kiyoshi Murata, Seto, all of Japan

[73] Assignees: Toyota Jidosha Kabushiki Kaisha; Mac Incorporated; Okaya and Co., Ltd., all of Japan

[21] Appl. No.: 645,267

[22] Filed: Aug. 29, 1984

[30] Foreign Application Priority Data

Aug. 31, 1983 [JP] Japan .................. 58-161071

[51] Int. Cl.$^4$ .................................. B01D 15/00
[52] U.S. Cl. ........................ 210/85; 210/689; 210/168; 210/416.5; 210/DIG. 6; 210/DIG. 7
[58] Field of Search ............ 210/662, 689, 85, 96.1, 210/510.1, 168, 416.5, DIG. 6, DIG. 7

[56] References Cited

U.S. PATENT DOCUMENTS 2,562,972 8/1951 Wald .................................. 210/689
4,129,501 12/1978 Haynes .................................. 210/689

*Primary Examiner*—Ivars Cintins
*Attorney, Agent, or Firm*—Finnegan, Henderson, Farabow, Garrett & Dunner

[57] ABSTRACT

A device in which moisture-adsorbing material that adsorbs moisture dissolved in oil and the electrical resistance of which decreases in accordance with the amount of moisture adsorbed, is immersed in circulating oil supplied to machinery and is connected to a sensor that outputs a signal when the electrical resistance of the material falls below a given preset value. This moisture-adsorbing material absorbs moisture not yet dissociated from the oil, and removes the moisture from the oil, preventing deterioration of the oil. Moreover, because the sensor electrically detects the decline in the adsorptive strength of the moisture-absorbing material as the amount of moisture adsorbed increases, upon depletion of this adsorptive capability the material can be rapidly replaced, permitting the moisture content of the oil to be held below a given value.

4 Claims, 2 Drawing Figures

Patent No. 4,609,458

DEVICE FOR REMOVING MOISTURE FROM OIL

BACKGROUND OF THE INVENTION

This invention relates to a device for removing moisture from lubricating and other types of oils circulated and supplied to machinery.

Trace amounts of moisture are generally present in oils such as lubricating oil. When the amount of moisture present is less than the saturation solubility, the water and oil remain coalescent and united. Under such conditions, the various properties required of an oil in oil circulation equipment, such as viscosity, fluidity, compressibility, lubricity, and rust-inhibiting effects, may be properly maintained. However, when moisture enters the oil from the atmosphere, machinery, or other sources, the water content of the oil rises above the saturation solubility. The excess moisture becomes liberated from the oil, and adversely affects certain properties of the oil such as its rust-inhibiting effects and lubricity. When oil containing free water is circulated through machinery, this accelerates rusting and the reduced lubricity of the oil aggravates the friction and wear of sliding and rubbing parts. The resulting decrease in oil viscosity also has a number of adverse effects, such as a reduced sealing action.

Various devices have been conceived for eliminating such problems. One such device is an oil-water separator that uses the difference in the specific gravities of oil and water to precipitate water liberated from the oil when the water content rises above the saturation solubility of the oil; the precipitated water is trapped and collected in a moisture precipitation tank. Another device separates and removes moisture from oil by causing the water to adhere to a cloth belt. All these devices remove water liberated from oil, and so do not function until the excess moisture dissociates from the oil. This means that, following liberation from the oil, the free water stands a very good chance of circulating through the machinery together with the oil until it is removed from the system by one of these devices. It is common especially in precision machinery for very small quantities of moisture to enter the oil gradually over long periods of time. When this happens, the oil clouds, following which the water and oil begin to dissociate. With conventional devices of the type just described, a considerable period of time elapses from the time at which the water and oil begin to dissociate up to the removal of the free water. During this period, there is a constant danger of the moisture circulating within the machinery, causing equipment deterioration and damage.

SUMMARY OF THE INVENTION

The object of the present invention is to provide a device for removing moisture from oil that is capable of adsorbing and removing moisture dissolved in oil before it dissociates from the oil, and that can hold the water content of the oil below a given value by detecting a decline in the adsorptive strength or capability of the adsorbing material below a predetermined point such as to allow the material to be replaced as needed.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the moisture-removing device of this invention comprises a circulation line that supplies oil to machinery, a moisture-adsorbing porous ceramic material positioned in the circulation line, the fine pores of the ceramic material being smaller than the molecules of said oil so that the oil molecules do not enter the pores, but being about the same diameter as water molecules and thus capable of trapping water molecules such that the porous ceramic material adsorbs moisture dissolved in said oil and its electrical resistance lowers in accordance with the amount of moisture adsorbed thereby, and a sensor electrically connected to said moisture-adsorbing ceramic material that outputs a signal when the electrical resistance of said moisture-adsorbing ceramic material falls below a given preset value.

As embodied herein, moisture-adsorbing material that adsorbs moisture, and the electrical resistance of which drops as the amount of adsorbed moisture increases, is positioned in an oil circulation line. This enables water to be separated from the oil before liberation of the water from the oil, effectively preventing deterioration of the oil due to the liberation and presence of free water, and alleviating problems that could be caused in the machinery. Moreover, the decline in the adsorptivity of the moisture-adsorbing material as the amount of water adsorbed increases is detected by a sensor as a decline in the electrical resistance of the moisture-adsorbing material. The moisture content of the oil can be held below a given value by replacing the moisture-adsorbing material when the sensor indicates this to be necessary.

The accompanying drawings, which are incorporated in and constitute a part of this specification, illustrate one embodiment of the invention and, together with the description, serve to explain the principles of the invention.

DESCRIPTION OF THE PREFERRED EMBODIMENTS

Figure 1:
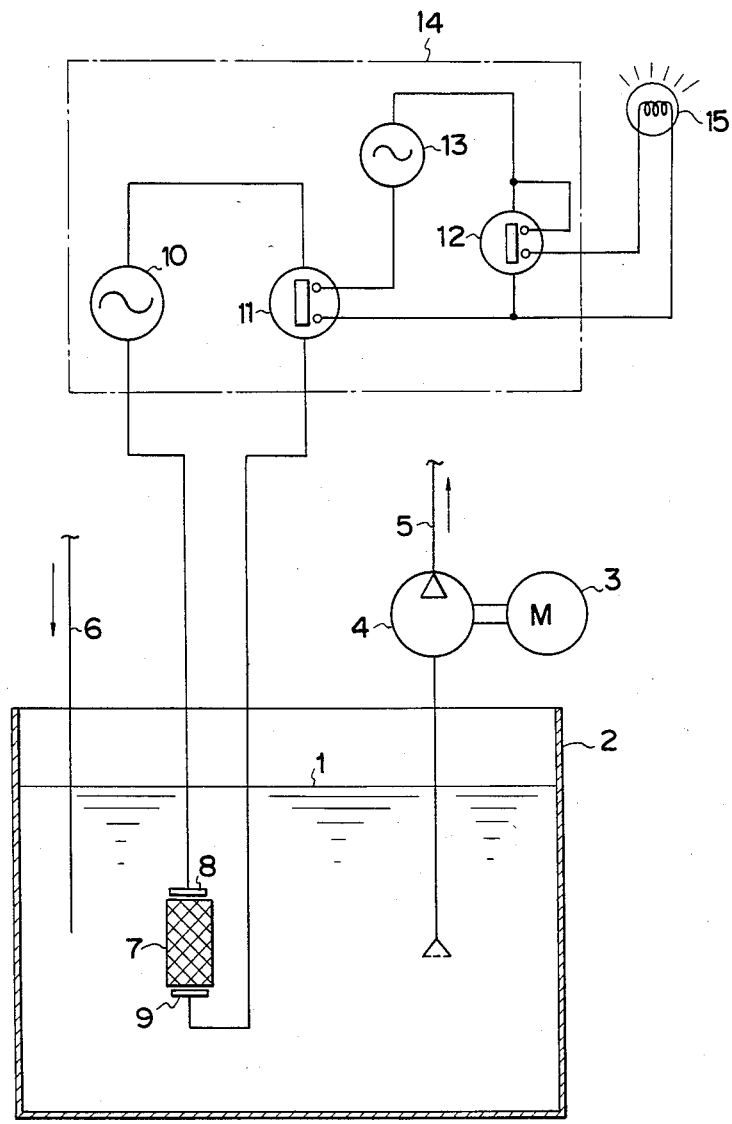
FIG. 1 is a schematic view showing one embodiment of a device for removing moisture from oil constructed in accordance with the present invention.

FIG. 1 is a schematic diagram showing one embodiment of this invention. Here, an oil tank 2 containing a lubricating or other type of oil 1 communicates with machinery (not shown) via an oil supply pipe 5 and an oil return pipe 6, along which is positioned a pump 4 driven by a motor 3. Moisture-adsorbing material 7 is situated in oil tank 2, where it is immersed in the oil. Moisture-adsorbing material 7 adsorbs water dissolved in the oil before this dissociates from the oil. As the amount of moisture adsorbed by the material increases, the electrical resistance of the material decreases.

Figure 2:
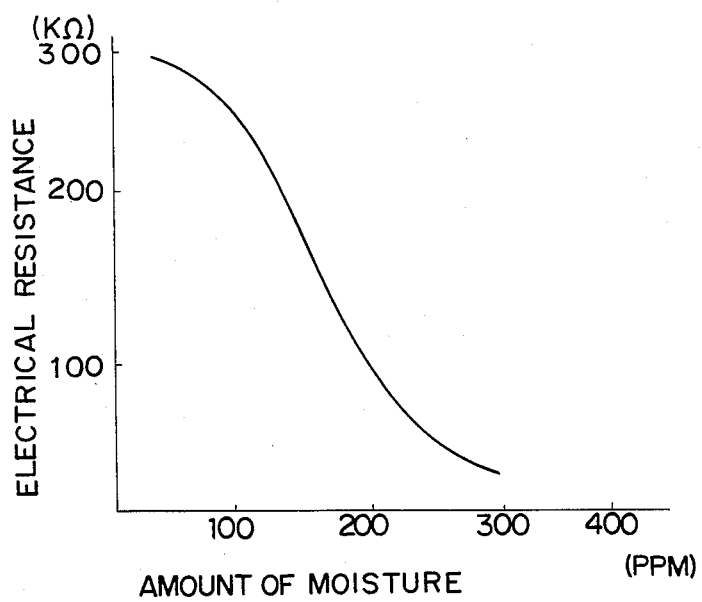
FIG. 2 is a graph of the amount of moisture adsorbed by the porous ceramic moisture-adsorbing material versus the electrical resistance of the same material.

This material 7 may consist of a porous ceramic plate containing fine pores which are smaller in diameter than the molecules of oil 1 and about the same size as molecules of water (approximately 3 angstroms). Molecules of water enter into the pores of this porous ceramic plate, and are there "trapped," but oil molecules are too large to enter the pores. As a result, only molecules of water are adsorbed. This type of porous ceramic acts as an insulator when dry, but when it adsorbs water, its electrical resistance falls on account of the conductivity of the adsorbed water. FIG. 2 is a graph plotting the amount of adsorbed water in porous ceramic moisture adsorption material versus the electrical resistance of the material.

A pair of electrodes 8 and 9 (FIG. 1) is attached to moisture-adsorbing material 7. Electrodes 8 and 9 are connected in series to a low-voltage a.c. power supply 10 and a voltage detector 11. The output terminals on voltage detector 11 are connected to a magnetic relay 12 and a relay power supply 13. Voltage detector 11, magnetic relay 12, and the power supplies 10 and 13 together comprise a sensor 14 that detects the electrical resistance of said moisture-adsorbing material 7 and outputs a signal when this resistance falls below a given preset value.

Voltage detector 11 is constructed such that a signal is output when the potential difference between electrodes 8 and 9 falls below a given value as a result of a decrease in the electrical resistance of moisture-adsorbing material 7. This output may be, for example, a current passed through the pair of output terminals. The contacts of magnetic relay 12 close when triggered by this output, in turn causing sensor 14 to emit an output. The sensor output may consist, for example, of the lighting of a display lamp 15 connected to the relay 12.

The effects and actions of the device so constituted shall now be described.

When pump 4 is operated by starting motor 3, the oil 1 within oil tank 2 is fed to the machinery via oil supply pipe 5, then returned to oil tank 2 via oil return pipe 6. When the oil is circulated in this manner by the pump, the oil flows over moisture-adsorbing material 7 in the oil tank, causing moisture dissolved in the oil to be trapped and adsorbed by the material. If there is a high level of moisture in the oil, moisture-adsorbing material 7 rapidly adsorbs a large amount of water, but if only a small amount of moisture is present, the material just adsorbs a lesser amount or a little at a time. In either case, water present in the oil is removed by moisture-adsorbing material 7 before it dissociates from the oil. This keeps the moisture level within the oil below a given value.

As the moisture-adsorbing material 7 adsorbs moisture from the oil, its electrical resistance decreases. This decrease is accompanied by a drop in the voltage detected by voltage detector 11. When the electrical resistance of the moisture-adsorbing material 7 drops below a given value, or more precisely, when the voltage detected by voltage detector 11 drops below a given preset value, the detector outputs a signal that triggers magnet relay 12, causing display lamp 15 to light. Hence, when the amount of moisture adsorbed by the moisture-adsorbing material 7 reaches the working limit of the material, display lamp 15 lights, telling the operator that the material should be replaced. By replacing the material and continuing to remove moisture from the oil, the water content of the oil can be held below a given value.

In the above-described embodiment of the present invention, sensor 14 comprises a voltage detector 11, a magnetic relay 12, and their respective power supplies 10 and 13, and outputs a signal that lights a display lamp 15. However, the sensor in the present invention is not limited to this or any other specific construction. The only condition placed on this sensor is that it be capable of detecting the electrical resistance of the moisture-adsorbing material and emitting an output signal when this resistance falls below a given preset value. Hence, bridge circuits, circuits utilizing the switching functions of transistors, and other types of circuits may be used as the sensor in this invention. Moreover, in the embodiment of the present invention described above, a display lamp is used to alert the operator that the moisture-adsorbing material has reached its adsorption limit. However, in practical embodiments of the device of the present invention, aside from optical means such as this of alerting the operator, other means may also be used, such as acoustic means involving a buzzer or other like device.

The present invention therefore comprises a moisture-adsorbing material that adsorbs water dissolved in oil and the electrical resistance of which decreases as the amount of water adsorbed increases, this material being positioned and immersed in circulating oil supplied to machinery, and being connected to a sensor that outputs a signal when the electrical resistance of the material falls below a certain, preset value. This structure maintains the moisture content of the oil below the saturation solubility of the oil, thus preventing deterioration of the oil. Stated differently, this prevents the dissociation of the moisture and oil, alleviating problems such as rusting and increased wear of the machinery. Moreover, because the sensor determines when the moisture-adsorbing material has reached its adsorption limit by detecting a decrease in the electrical resistance of the material, the moisture-adsorbing material can be replaced when required, making it possible to reliably hold the moisture content of the oil below a given value.

We claim:

1. A device for removing moisture from oil comprising a circulation line that supplies oil to machinery,
    a moisture-adsorbing porous ceramic material positioned in the circulation line, the fine pores of the ceramic material being smaller than the molecules of said oil so that the oil molecules do not enter the pores, but being about the same diameter as water molecules and thus capable of trapping water molecules such that the porous ceramic material adsorbs moisture dissolved in said oil and its electrical resistance lowers in accordance with the amount of moisture adsorbed thereby, and
    a sensor electrically connected to said moisture-adsorbing ceramic material that outputs a signal when the electrical resistance of said moisture-adsorbing ceramic material falls below a given preset value.

2. The device according to claim 1 wherein said circulation line comprises an oil tank, an oil pump that delivers oil from said oil tank to said machinery, an oil supply pipe connected to said oil pump that discharges oil from said oil tank, and an oil return pipe that returns oil to the oil tank, said moisture-adsorbing material being immersed in the oil in said oil tank.

3. The device according to claim 2 wherein the fine pores of the porous ceramic material have a size of approximately 3 angstroms.

4. The device according to claim 1 wherein the fine pores of the porous ceramic material have a size of approximately 3 angstroms.

* * * * *